United States Patent [19]

Bron

[11] 4,441,236
[45] Apr. 10, 1984

[54] SAFETY LOCK

[76] Inventor: José Bron, Hemsterhuisstraat 159, 1065 JX Amsterdam, Netherlands

[21] Appl. No.: 226,534

[22] Filed: Jan. 19, 1981

[30] Foreign Application Priority Data

Jan. 18, 1980 [NL] Netherlands ............... 8000322

[51] Int. Cl.³ .......................................... A44B 11/25
[52] U.S. Cl. .................................. 292/336.3; 24/602; 24/572; 74/2; 292/201; 292/DIG. 65
[58] Field of Search .......... 24/230 R, 230 A, 230 BC, 24/230 AK, 230 AL; 70/465, DIG. 10; 292/336.3; 74/2

[56] References Cited

U.S. PATENT DOCUMENTS 3,146,027 8/1964 Winberg ..................... 24/230 AL
3,675,281 7/1972 Stephenson ................ 24/230 AL
4,049,293 9/1977 Bouju ......................... 24/230 AL X

*Primary Examiner*—Robert P. Swiatek
*Attorney, Agent, or Firm*—Louis E. Marn; Elliot M. Olstein

[57] ABSTRACT

A usually unloaded feeler member responsive to a critical change of condition and incorporated in the lock of e.g. a buckle fastening of a safety belt, which feeler member is adapted under spring action to move the locking member of the lock from the locking position to the release position.

14 Claims, 7 Drawing Figures

SAFETY LOCK

The invention concerns a lock having a locking member displaceable between a locking position and a release position.

With certain applications of such a lock, circumstances may occur which render it desirable for safety reasons that the locking member of the lock is displaced automatically, i.e. without hand operation, from the locking position to the release position. An important example of such an application forms the lock of a buckle fastening of a safety belt for motor-cars. In case the motor-car is submerged or catches fire as a result of a traffic accident, it may easily occur that the occupant cannot open the buckle fastening himself through his confusion or because he is stunned by the shock, which impedes rescue efforts. The same applies in case the motor-car door is locked at the inside and therefore cannot be opened from the outside. Naturally also other critical conditions are conceivable wherein it is desired that a lock is automatically opened or a latch locking effected by hand or by key is removed.

French Pat. No. 2,264,691 discloses a lock incorporated in a safety belt of a vehicle, in which lock extend the two free belt ends and each lock being provided with a spring-loaded, water-soluble cushion. In case the vehicle is submerged, the cushion will be dissolved, so that the spring allows that at least one of the belt ends can freely move out of the lock.

This prior art device, however, has the drawback that use is made of a separate lock to be incorporated in the safety belt. Furthermore the water-soluble material is continuously loaded.

It is the object of the invention to provide a lock of the above-described type and which is devoid of these drawbacks.

The lock according to the invention has the feature that it is provided with a safety device for automatically unlocking the locking member upon a critical change of a given ambient condition, which safety device comprises at least one feeler member usually unloaded and responsive to the change of condition concerned and being provided with an unlocking element which is movable under spring action from a retracted, rest position, wherein said element does not influence the locking member of the lock, to an operative condition, wherein said element displaces the locking member to the release position, said unlocking element being retained in the rest position by a catch co-acting with the feeler member, which catch is operated when the feeler member responds to a change of condition and then releases the unlocking element.

According to an important embodiment of the invention, the feeler member comprises a liquid-absorbing swelling body which presses the catch to the release position during its swelling by liquid absorption. To this effect according to the invention the swelling body may be accommodated in a chamber bounded at one side by a slide, which slide engages the catch. If consequently the swelling body contacts a liquid, e.g. in that it is submerged, the swelling-up swelling body pushes the slide aside, so that the catch is operated and the unlocking element through the effect of the spring engaging thereon can move the lock latching member to the release position.

According to an embodiment of the invention, the lock is a buckle fastening with snap effect, in particular for a safety belt for motor-cars or the like, whereby the safety device together with the feeler member designed as a swelling body is accommodated in the buckle housing. If consequently the motor-car is submerged so that the swelling body comes into contact with water, the buckle fastening will be automatically opened. As a result there is produced a compact construction, while moreover the feeler member is usually unloaded.

According to a different embodiment of the invention, the lock is a door lock, in particular for a motor-car door, of the type that is closable at one side through a key and at the other side having an actuating member, such as a sliding pin provided with a hand knob, by means of which the lock can be locked and unlocked from this side, whereby the unlocking element of the safety device being under spring pressure, upon actuation of said device, operates the actuating member of the door lock when said pin is in the lock latching position. If consequently the occupant of a motor-car has closed the door by depressing the lock sliding pins at the inside, said sliding pins, in case the motor-car is submerged, will be automatically pressed to the unlocking position by the swelling bodies of the associated safety devices, so that the doors can be opened from the outside in case of a rescue operation.

According to the invention it is favourable when the safety device comprises besides the swelling body also as a second feeler member a temperature-responsive member for unlocking the locking member of the lock. It is achieved thereby that also in case of fire the locking member is displaced to the release position, i.e. the buckle fastening will be opened or the door lock is unlocked. This embodiment with temperature increase-responsive safety device may also be applied e.g. to door locks of hotel rooms and the like, so that in case of fire these can be opened from the outside. It is observed in this respect that German Offenlegungsschrift No. 2,653,124 discloses per se a temperature-responsive feeler member for a safety belt, wherein use is made of electric connections, which have the drawback that they can be easily put out of operation, while in the device according to the invention use is made of an entirely mechanical disconnecting mechanism.

Some embodiments of the lock with safety device according to the invention will now be described, by way of example, with reference to the accompanying drawings, while also other preferred constructive features will be discussed.

Figure 1:
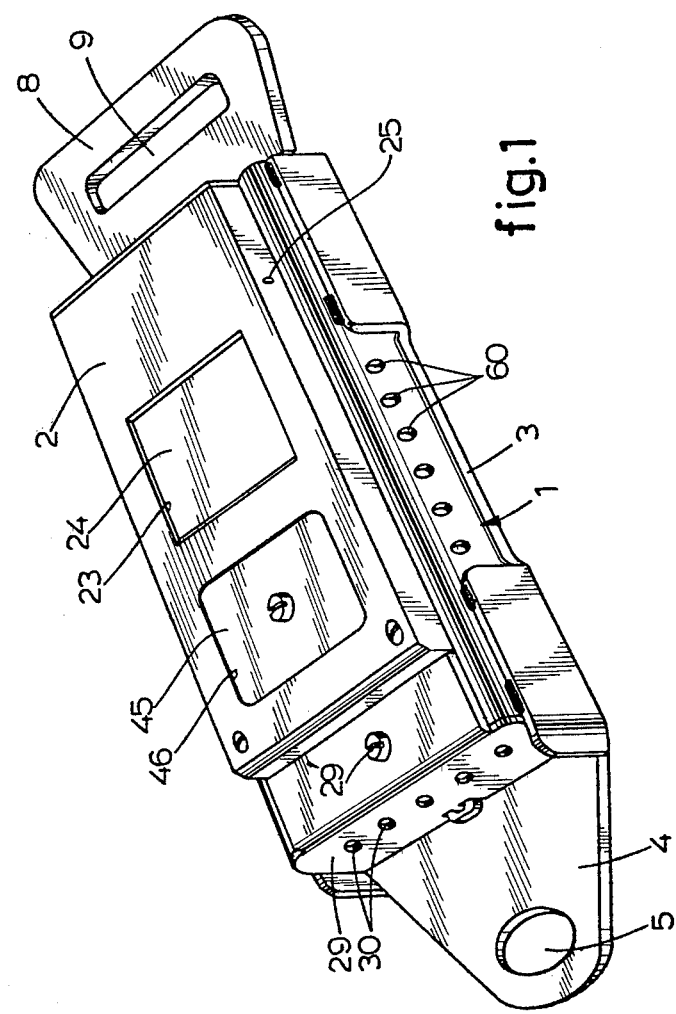
FIG. 1 is a perspective view of a buckle fastening for a safety belt for motor-cars and the like, wherein the safety device is accommodated.

The buckle fastening for a safety belt shown in FIGS. 1-5 has a flat housing 1 with a cover 2 screwed thereon, which housing is secured to a carrier plate 3 projecting with a lip portion 4 beyond the housing and having therein a fixing hole 5 for the buckle. At the end facing away from the lip portion 4, the housing has an end wall 6 which releases between its lower edge and the housing bottom an insert slot 7 for a flat buckle tongue 8, having at the rear side a slotted hole 9 for attachment of the belt, not shown, and at its leading insert end a locking opening 10.

Figure 5:
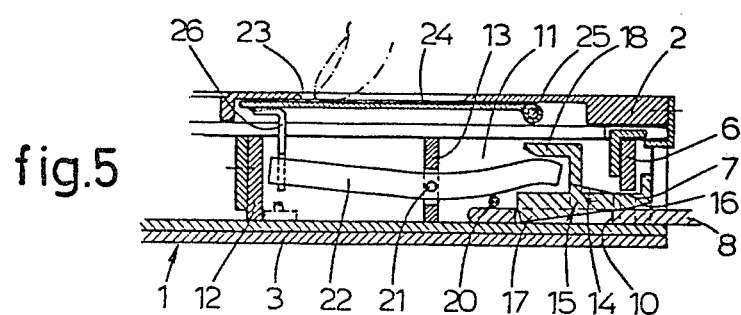
FIG. 5 is a cross-section on the line V—V of FIG. 2.

In the housing 1 there is secured a framework comprising flat longitudinal bars 11 (FIG. 2), which are rigidly connected besides by the end wall 6 also by transverse walls 12 and 13. In pivot openings 14 of the longitudinal bars 11 there is rotatably supported a locking body 15, which has a guide tongue 16 for the buckle tongue 8 projecting rearwardly through the insert slot 7, at the bottom side a downwardly extending locking cam 17 fitting in the locking opening 10 of the buckle tongue 8 and at the top side a hook-shaped portion 18. On the locking body 15 acts a leaf spring 19 attached at the one longitudinal bar 11, which spring keeps the locking body pressed in the closure position, wherein the locking cam 17 with its leading edge abuts against the bottom of the housing 1. Thus there is formed a buckle fastening with snap effect in that the buckle tongue 8 during insertion in the insert slot 7 finds guidance between the guide tongue 16 of the locking body 15 and the housing bottom and subsequently also underneath a pin 20, thereby pressing the cam 17 in upward direction against the leaf spring 19 until this can fall in the locking opening 10 of the buckle tongue, engaging behind the leading edge of said opening 10 (FIGS. 3 and 5). For manually lifting the locking body 15 serves a lever 22 supported pivotally about a pivot pin 21 in an opening in the transverse wall 13, said lever engaging with one end underneath the hook-shaped portion 18 of the locking body 15. Behind a rectangular opening 23 cut out in the cover 2 there is present a finger pressure plate 24 which on the one end is rotatably secured to the cover 2 by a pivot pin 25 and which carries at its opposite edge a downwardly projecting fork-shaped pressure member 26 which engages about the respective end of the lever 22. Between the bottom of the housing 1 and the finger pressure plate 24 there is positioned a pressure spring 27 (FIG. 3) which keeps said plate pressed against the bottom side of the cover 2. By a pressure with the finger on the plate 24 against the action of the spring 27 it is thus possible to rotate the lever 22 through the pressure member 26 to a position wherein said lever, by means of the hook-shaped portion 18, swivels the locking body 15 to the unlocked position releasing the buckle tongue 8.

The above described parts of the buckle fastening are of an embodiment conventional for such fastenings.

According to the invention there is now accommodated in the buckle housing 1 a safety device ensuring that the locking body 15 automatically unlocks the buckle tongue 8 when the buckle housing is exposed to the effect of water or a high temperature.

At the back side of the buckle housing 1 there is formed a chamber 28 which is bounded at the outer side by a detachable back plate 29 constituting the back wall of the housing 1 and secured by a screw 29' and provided with holes 30, and at the inner side by an L-shaped slide 31, which slide 31 is guided by transverse guide pins 32 disposed between the longitudinal bars 11. In the chamber 28 there is positioned a cylindrical swelling body 33 of a suitable cellulose which lies enclosed with slight play between the wall 29 and the slide 31 and, if desired, as drawn, may be kept by a spring 34 in slightly clamped relationship. Upon removal of the back plate 29, the chamber 28 is accessible for insertion of the swelling body 33.

Figure 2:
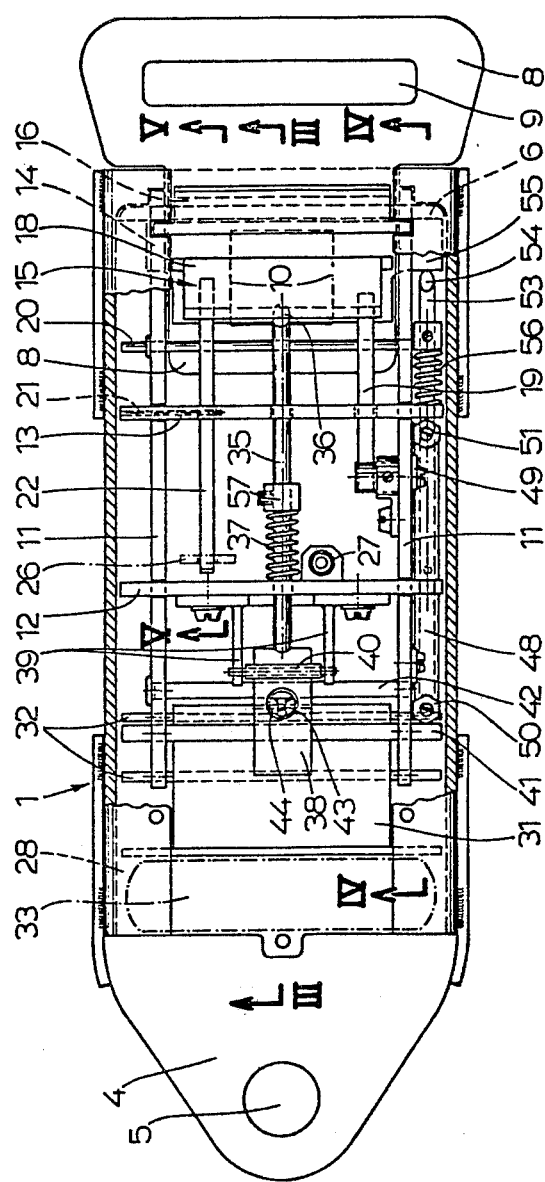
FIG. 2 is a top view and partly a horizontal cross-section of the buckle fastening of FIG. 1.
Figure 3:
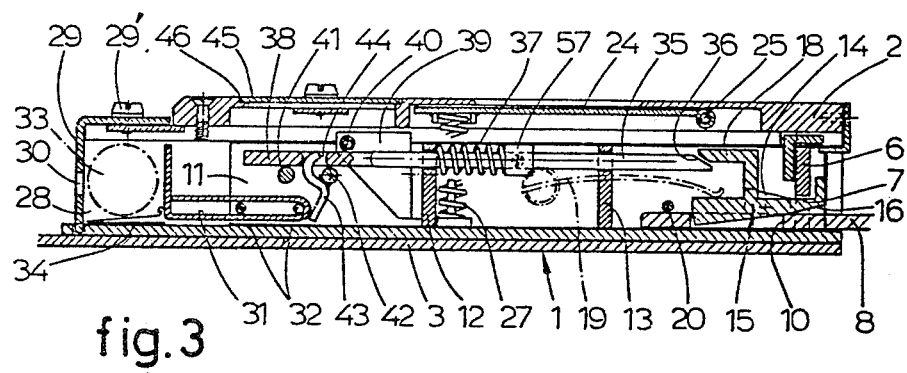
FIG. 3 is a cross-section on the line III—III of FIG. 2.

In fitting holes in the transverse walls 12 and 13 there is slidably guided an unlocking rod 35 which in the retracted rest position shown in FIGS. 2 and 3 engages with its beveled leading end 36 with slight play underneath the edge of the hook-shaped portion 18 of the locking body 15. About the rod 35 there is positioned a helical spring 37 which on the one end finds support against the transverse wall 12 and on the other end against a sleeve 57 fixed onto the rod 35, thus trying to press the rod 35 forwardly. At the rear end of the rod 35 there is affixed a plate 38 which is guided between an upper guide roller 40 carried by supports 39 and two lower guide rollers or pins 41 and 42 which are supported in the longitudinal bars 11. The guide pin 42 likewise forms the pivot pin for a two-armed rotary catch 43, the upper, bent arm of which is inserted in an opening 44 of the plate 38 and the lower arm of which presses against the slide 31. The catch 43 thus prevents the unlocking rod 35 from sliding forwards through the effect of the spring 37, whereby the unlocking pawl retains the slide 31 in its rearward position under the effect of the spring pressure, in which position it abuts against the front guide pin 32. If, however, the buckle fastening comes to lie under water and this water can penetrate through openings 30 into the chamber 28, the swelling body 33 will rapidly swell and press the slide 31 forwardly through its expansion, so that the catch 43 is rotated away from the opening 44 and thus releases the unlocking rod 35. As a result the spring 37 can press the rod 35 forwardly and said rod can lift with its end the locking body 15 until the buckle fastening is opened.

In the housing cover 2 there is provided yet an access opening 46 covered by a detachable closure plate 45, enabling, after operation of the unlocking rod 35, to slide same back to its starting position and to position the catch 43 again in the locking position by means of a suitable tool.

Figure 4:
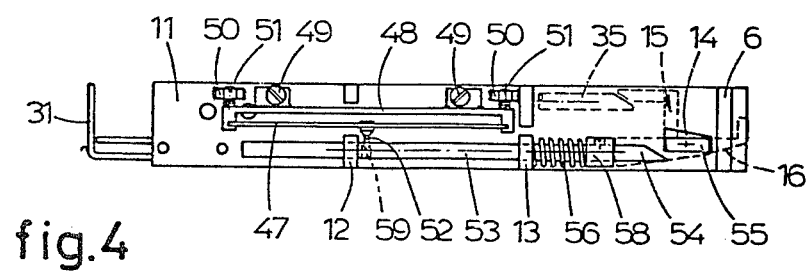
FIG. 4 is a cross-section on the line IV—IV of FIG. 2.

The safety device accommodated in the buckle housing 1 furthermore comprises a bimetal element 47 (FIG. 4), which is fixed with its ends in a holder 48, which holder is secured by screws 49 against the outer side of one of the longitudinal rods 11, so that the holder and the bimetal lie incorporated in the space between the longitudinal rod 11 and the adjacent housing sidewall. Furthermore two nuts 50 are welded against the rod 11 and wherein are screwed adjusting screws 51 pressing against the ends of the holder, enabling to accurately adjust the device by a slight bending of the elongate holder 48. The bimetal element 47 carries in the center a downwardly extending catch in the form of a pin 52. Underneath the bimetal element 47 there extends a second unlocking rod 53 which is guided slidably in holes in ends of the transverse walls 12 and 13 projecting beyond the longitudinal bar 11 and engaging with a beveled end 54 with some play underneath a support member 55 of the locking body 15 projecting through the pivot opening 14 of the longitudinal bar 11. FIG. 4 shows that said opening 14 is formed in such a way that the support member 55 is adapted to perform a pivoting movement therein. About the unlocking rod 53 there is positioned a helical spring 56 which lies enclosed between the transverse wall 13 and a sleeve 58 affixed onto the rod 53 and thus trying to press the rod 53 forwardly. In the rest position shown the unlocking rod 53, however, is locked in that the locking pin 52 is inserted in a transverse bore hole 59 of the rod 53.

The bimetal element 47 is designed in such a way that when heated said element deflects upwardly in the center, thereby pulling the locking pin 52 from the hole 59 of the unlocking rod 53 so that at a given strongly increased critical ambient temperature, the pin 52 releases the unlocking rod 53 so that the spring 56 can press said rod with its end 54 underneath the portion 55 of the locking body 15 for unlocking the buckle fastening. In the sidewall of the housing 1 extending along the bimetal 47 there are provided ventilation holes 60 (FIG. 1).

Figure 6:
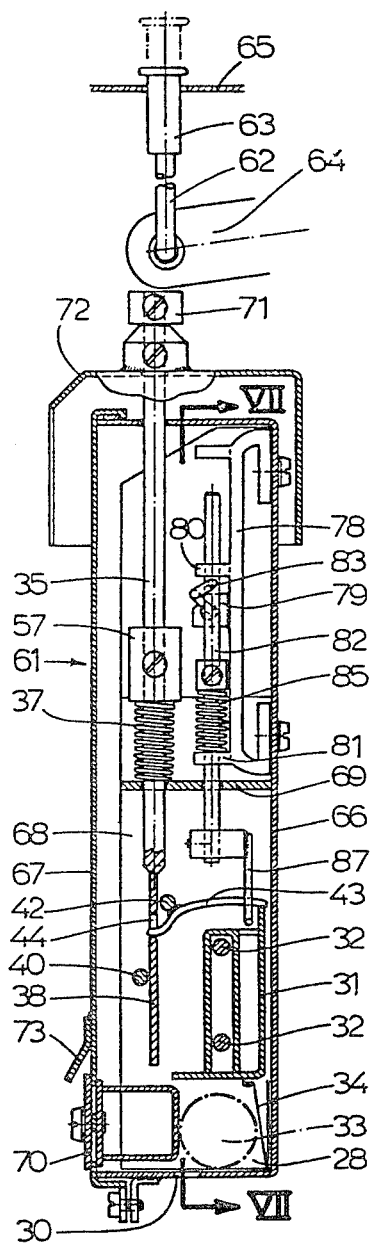
FIG. 6 is a vertical cross-section of a safety device for a motor-car door lock, of which only the locking sliding pin is drawn.
Figure 7:
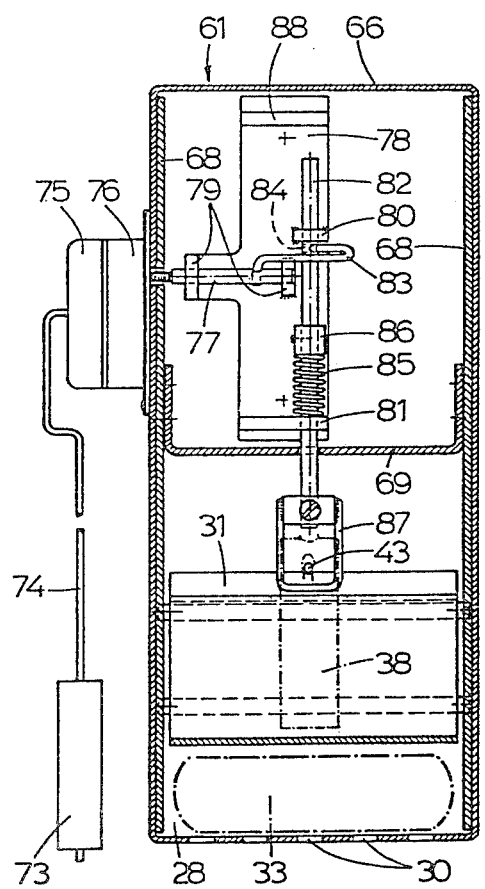
FIG. 7 is a cross-section on the line VII—VII of FIG. 6.

The safety device shown entirely by 61 in FIGS. 6 and 7 serves for unlocking a door lock of a motor-car door in case of calamity. The door lock may have a conventional design and is of the type that is lockable at the exterior with a key for locking the normal hand crank or the like serving for operating the latch of the lock, whereby the lock at the inner side of the door has a sliding pin fitted with a hand knob, through which sliding pin the lock can be locked and unlocked from this side. The lock itself is not shown in FIGS. 6 and 7 since this may remain unchanged and may have any suitable design. However, the above mentioned sliding pin 62 with hand knob 63 is indicated, which is connected through a lever 64 to the door lock in such a way that in the depressed position of the knob 62 shown in full lines the lock is latched against operation from the outside, while in the dotted lifted position of the knob, said locking is removed. The lock with the lever 64 and the sliding pin 62 are accommodated conventionally in the door, while the knob 63 projects through an opening in the window opening edge 65 of the door.

The device 61 forms a separate part which is adapted for assembly in the door underneath the sliding pin 62 in a suitable manner, not further indicated and consequently, if desired, can also be incorporated in an already existing door.

The device 61 has a housing 66 with cover 67 and a framework positioned in the housing consisting of side plates 68 and a transverse wall 69 rigidly connected therewith.

The safety device 61, as regards its operation in case of immersion in water has a design analogous to that of the device described on the basis of FIGS. 2 and 3, while in FIGS. 6 and 7 identical parts are indicated with the same reference numerals as in FIGS. 2 and 3. The device 61 again has a swelling body 33 accommodated in a chamber 28, which chamber in the present case is accessible by an access door 70 provided in the cover 67 and projecting along some distance inwardly, while furthermore holes 30 provided in the housing wall terminate in the chamber 28. The swelling body acts on the slide 31 guided on pins 32, against which slide is supported the one arm of the two-armed pivotally mounted catch 43 which on the other end engages in the opening 44 of the plate 38 guided between the pins 42 and 40, which plate is affixed to the rear end of the unlocking rod 35. Said rod 35 in the present case is guided axially slidably through fitting openings in the transverse wall 69 and the upper wall of the housing 66 and is under pressure of the helical spring 37 which lies enclosed between the transverse wall 69 and the sleeve 57 secured onto the rod 35. The end of the unlocking rod 35 in this case projects from the housing 66 in outward direction and carries a stop head 71 secured thereon, which in the drawn rest position of the unlocking rod 35 lies with slight play underneath the bottom end of the lock sliding pin 62 respectively the lever 64 pivotally secured thereon. It will be clear that in case through expansion of the swelling body 33 the catch 43 releases the unlocking rod 35, said rod through the effect of the spring 37 will be urged upwardly, thereby forcing with its head 71 the lock sliding pin 62 to the dotted unlocking position. On the outwardly projecting end portion of the unlocking rod 35 there is mounted yet a drip cap 72 engaging about the housing 66, while on the cover 67 above the access door 70 there is attached a projecting drip edge 73 to prevent any rain or wash water seeping into the door from attaining the swelling body 33.

The safety device 61 is designed with a temperature-responsive member which in the present case comprises a container 73 filled with a medium expandable upon heating and which is connected through a pipe 74 to a diaphragm box 75 mounted against the side of the housing 66 of a known per se design. The container or feeler 73 may be secured in a suitable place against the inner wall of the respective motor-car door, preferably behind an opening in said door wall covered by a grid or the like. The diaphragm of the diaphragm box 75 acts through a transmission mechanism 76 on a sliding rod 77 conducted through the housing wall into the housing. Against the bottom of the housing 66 there is secured an assembly plate 78 which has upright supports 79 fitted with a guide hole for guidance of the sliding rod 77 and similar supports 80, 81 for the guidance of an unlocking rod 82. On the sliding rod 77 there is mounted a catch 83 which with its bent back end is inserted in a transverse hole 84 of the unlocking rod 82, thereby retaining said rod in the rest position drawn. On the unlocking rod 82 there acts again a helical spring 85 which lies enclosed between the support 81 and a sleeve 86 secured on the rod 82 and which tries to press the rod 82 upwardly. At the bottom end of the unlocking rod 82 there is secured a clip 87 which in the rest position drawn engages with some play about the end of the catch 43 facing towards the slide 31. On the assembly plate 78 there is formed yet a stop shoulder 88 which limits the upward movement of the unlocking rod 82.

When for instance in case of a motor-car fire the medium in the container 73 expands through heating, the diaphragm of the diaphragm box 75 will press the slide rod 77 inwardly in such a way that at a given, predetermined critical temperature of the medium, the catch 83 is pressed by the sliding rod 77 from the hole 84 of the unlocking rod 82. Thus the unlocking rod 82 is pressed upwardly by the spring 85, while the clip 87 entrains the pivoting catch 43 so that also the unlocking rod 35 is released and thus, as described in the above, the locking sliding pin 62 of the door lock is pressed upwardly to the unlocked position.

Although the safety device described in the above for unlocking or opening a lock is suitable in particular for application in combination with a buckle fastening for a safety belt or the lock of a motor-car door, also other favourable applications are conceivable. For instance, the safety device may be accommodated in the buckle fastening between the harness of a parachute and the parachute lines, so that this fastening will be automatically opened when the parachutist arrives in the water. A temperature-responsive member in that case is not necessary. The latter again is the case though upon application of the safety device described in combination with a door lock closable at the inside by a latch or the like of e.g. a door of a hotel room, so that in case of fire this locking is automatically removed. In general, the swelling body may be omitted in the latter application.

What I claim is:

1. A lock having a locking member displaceable between a locking position and a release position, characterized in that said lock is provided with a safety device for automatically unlocking the locking member upon a critical change of a given ambient condition, said device comprised of at least one usually unloaded feeler member responsive to a change of ambient condition and provided with a spring loaded unlocking element, movable from a retracted rest position to an operative position, said unlocking element displacing said locking member from said locking position to said release position, a catch member retaining said unlocking element in said rest position, said catch member co-acting with said feeler member and actuated by said feeler member in response to a change of condition to release said unlocking element thereby displacing said locking member.

2. The lock according to claim 1, characterized in that said feeler member is comprised of a liquid-absorbing swelling body to actuate said catch member and thereby release said unlocking element upon swelling up by liquid absorption.

3. The lock according to claim 2, characterized in that said swelling body is enclosed in a chamber formed by a side of a slide member slidably engaged with said catch member.

4. The lock according to claim 3, characterized in that said catch member is rotatably mounted and is comprised of two arm elements, one arm element engaging a shoulder of said unlocking element the other arm element engaging said slide member, a spring compressively disposed on said unlocking element to maintain said rest position defined by a stop such that swelling of said swelling body displaces said slide to rotate said catch against said spring action until said catch disengages said shoulder of said unlocking element.

5. The lock according to claims 1, 2, 3 or 4 characterized in that said unlocking element is comprised of a longitudinally slidably guided unlocking rod having a leading end adapted to act on said locking member and at its rear side an opening to engage said catch member.

6. The lock according to claims 1, 2, 3 or 4 characterized in that said feeler member is a temperature-responsive member responsive to a strongly increased critical ambient temperature for actuating said catch member.

7. The lock according to claims 1, 2, 3 or 4, characterized in that said lock is a buckle in a buckle housing fastening with a snap effect, in particular a safety belt for motor-cars or the like, and that said safety device includes a feeler member designed as a swelling body.

8. The lock according to claim 7, wherein said buckle has as a locking member a locking body mounted pivotally in said buckle housing and pressed by a spring to a closure position, said locking body adapted to engage in an opening of a buckle tongue insertible into the buckle housing by an insert slot and for unlocking is adapted to be lifted from said tongue opening by a hand knob-operated lock lifting rod, said unlocking element slidably guided in the buckle housing is adapted to engage an edge of said locking body of said buckle for lifting same.

9. The lock according to claim 7, characterized in that said safety device comprises besides said swelling body a temperature-responsive member comprised of a bimetallic element accommodated in a buckle housing, said bimetallic element operating on a catch for a separate unlocking rod for said locking body of said buckle and slidably guided in said buckle housing under spring pressure.

10. The lock according to claims 1, 2, 3 or 4, characterized in that said lock is a door lock, in particular for a motor-car door, of the type that is closable at one side by a key and at the other side by an actuating member, such as a sliding pin provided with a hand knob, by means of which the lock can be locked and unlocked from said other side, said unlocking element of said safety device being under spring pressure and upon actuation of said safety device, actuates said sliding pin of said door lock when said pin is in a lock latching position.

11. The lock according to claim 10, characterized in that said safety device is accomodated in a separate housing and said unlocking element comprises a push rod projecting outwardly from said separate housing, a head of said push rod opposite an end of the actuating member with respect to the lock sliding pin facing away from an actuating knob for the actuation thereof.

12. The lock according to claim 11, characterized in that said safety device comprises besides a swelling body likewise a temperature-responsive member for unlocking said push rod.

13. The lock according to claim 12, characterized in that said temperature-responsive member comprises a container filled with a medium expanding when heated and connected through a conduit to a diaphragm box attached to said separate housing of said safety device, said diaphragm of said box being coupled to a catch member.

14. The lock according to claim 13, characterized in that said temperature-responsive member includes another unlocking element, upon actuation thereof, acts on a catch of said push rod actuated by said swelling body.

* * * * *

UNITED STATES PATENT AND TRADEMARK OFFICE
CERTIFICATE OF CORRECTION

PATENT NO. : 4,441,236
DATED : APRIL 10, 1984
INVENTOR(S) : JOSÉ BRON

It is certified that error appears in the above-identified patent and that said Letters Patent is hereby corrected as shown below:

In the Claims:

Claim 1, line 11, immediately after "element", insert -- which through the effect of a spring --

Signed and Sealed this

Thirteenth Day of November 1984

[SEAL]

Attest:

GERALD J. MOSSINGHOFF

Attesting Officer

Commissioner of Patents and Trademarks